United States Patent [19]

Nicholson

[11] 4,290,616

[45] Sep. 22, 1981

[54] GASKETS

[76] Inventor: Terence P. Nicholson, Calf Hall, Muggleswick, Derwentside, County Durham, England

[21] Appl. No.: 133,843

[22] Filed: Mar. 25, 1980

[30] Foreign Application Priority Data

Nov. 23, 1979 [GB] United Kingdom ............... 40625/79

[51] Int. Cl.³ ............................................. F16J 15/08
[52] U.S. Cl. ................................... 277/235 B; 277/1;
277/234; 277/236; 277/213
[58] Field of Search ........... 277/235 R, 235 A, 235 B,
277/233, 234, 227, 213, 1, 236

[56] References Cited

U.S. PATENT DOCUMENTS 4,203,608  5/1980  Nicholson ...................... 277/237 X

FOREIGN PATENT DOCUMENTS 893598   10/1953  Fed. Rep. of Germany ... 277/235 B
1003523  2/1957   Fed. Rep. of Germany ... 277/235 B
906350   5/1945   France ................................. 277/234
323075   12/1929  United Kingdom ............ 277/235 B
508050   6/1939   United Kingdom ............ 277/235 B Primary Examiner—Robert S. Ward, Jr.

[57] ABSTRACT

A gasket particularly for sealing the joint between the cylinder block and the cylinder head of a dry liner internal combustion engine comprises a pair of outer metal plates (1) having outwardly directed corrugations formed therein and a central composite metal plate (2) disposed between the two outer plates (1); the central composite plate comprises a central soft metal layer and hard metal surface layers which are bonded or integral therewith.

3 Claims, 5 Drawing Figures

GASKETS

This invention relates to gaskets and more particularly to a gasket primarily intended for sealing the joint between the cylinder block and the cylinder head of an internal combustion engine having so-called dry cylinder bore liners.

It has hitherto been the practice to use composite metal and asbestos layered gaskets for sealing the cylinder block, cylinder head joints in dry liner compression ignition engines. However in modern high output engines of this type, particularly when such engines are pressure charged or turbocharged and give rise to very heavy vibrations, great difficulty is experienced in establishing leak-proof seals by use of such gaskets. Apart from this composite metal and asbestos gaskets have the following disadvantages:

1. Because of the heat insulating property of asbestos it is impossible to avoid excessively high—and therefore most undesirable—thermal gradients in the engine.
2. The squashiness of this composite gasket is a major cause of the cylinder head and block being badly distorted so as to take a permanent set during heating and cooling cycles.
3. The need for exceptionally high clamping loads.
4. The need for re-tightening hold-down nuts because of loss of clamping load—this being a very expensive operation, and
5. The fact that unnecessary excessive clamping loads are the cause of serious distortion of the cylinder bores.

The basic task to be achieved by a gasket in this situation is that of sealing gas water and oil systems simultaneously without leakage between two essentially cellular structures bolted together and subjected to heavy vibrations, high thermal gradients and pressure cycling at constantly changing modes.

The concept of establishing a sealed assembly by bolting two such cellular structures into a solid static mass is erroneous since the sealed assembly when the engine is in operation is very much a live vibrating mass. This suggests that a suitable gasket must possess a substantial amount of resilience.

This of itself however is not sufficient since two other factors are very important namely:

1. Avoidance of unduly high clamping loads; and
2. Very efficient diffusion of heat over as wide an area of the gasket as possible.

To achieve (1) it is essential that instead of spreading the clamping load over the whole surface area of the faces of the cylinder head and block, the load should be concentrated into closely defined areas that is to say there should be what is termed "high unit loading". This suggests that a corrugated form of gasket would prove to be effective but whilst such a gasket has resilience, a high unit loading characteristic and good heat transfer properties experimental tests have indicated an insufficient resilience. In an attempt to double the amount of resiliency without necessarily requiring a doubled clamping load a test was made using two corrugated gaskets fitted back to back. This gave an improved result with only a 20 to 25 percent increase in clamping load, but was not considered entirely satisfactory. A test was also made using a sandwich construction consisting of two corrugated gaskets as aforesaid separated by a steel spacer plate. However so far as achieving adequate resilience was concerned the results were neither better nor worse than those obtained with the double gasket regardless of whether the spacer plate was made of soft steel or hard steel.

Further development work however resulted in the present invention according to which a gasket comprises a pair of outer metal plates having outwardly directed corrugations formed therein and a central composite metal plate disposed between the outer metal plates and itself comprised of a central soft metal layer having hard metal layers on each surface. There is thus constituted a three piece gasket comprised of two outer corrugated sheets and an intermediate composite layer sheet. The effect of the two hard metal surface layers is to restrain the central soft metal layer from lateral flow at points of high unit loading, and thereby impart the additional resilience which was sought. The resilience of the gasket can in fact be varied by varying the thickness of the centre plate.

Preferably but not necessarily the corrugations of the outer plates have the characteristic features disclosed in my U.S.A. Patent Application Ser. No. 930,429, filed on Aug. 2, 1978, now U.S. Pat. No. 4,203,608. Each such plate thus has a double waveform sectional configuration in which the distance between a plane which contains the apices of the two waves and a plane parallel thereto which contains the base of the trough between the two waves is significantly less than the distance between the first plane and the base plane of the plate.

The composite layer sheet ideally comprises a layer of soft steel to each side of which there is brazed or soldered a layer of spring steel. However this is not an economical procedure for commercial production and it is preferred to create the hard surface layers by slightly re-rolling the central steel layer after it has been annealed and softened.

A preferred gasket in accordance with the present invention is illustrated in the accompanying drawing in which.

Figure 3:
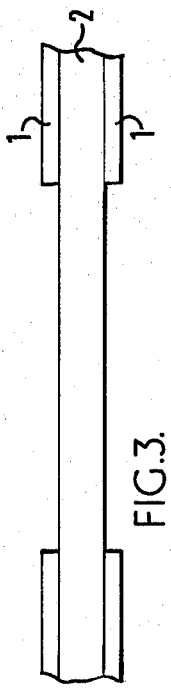
FIG. 3 is a view in the direction of arrow E in FIG. 1.

The gasket which is shown in the drawings and hereinafter described is intended to seal the joint between the cylinder block and the cylinder head of a six cylinder dry liner compression ignition engine equipped with a turbocharger. As shown most clearly in FIGS. 3, 4 and 5, it comprises two outer cold roller mild steel bright annealed grade CS 4 plates 1 0.015 inches in thickness and an interposed central composite plate 2 which is 0.031 inches in thickness. This plate 2 is also of mild steel which has been bright annealed and softened. It has however been subjected to a skin rolling operation which has the effect of forming a hard metal layer on each of its surfaces and it is this feature which mainly contributes to the efficiency of the gasket. The gasket is coated overall with a 0.001 inch thick layer of copper. Apart from this the outer plates 1 are formed with corrugated configurations of two different forms. The paths of these corrugations on the gasket are illustrated in chain dashed lines in FIG. 1 and FIG. 2, the chain lines being drawn at the peaks or locus points of the corrugations.

Figure 1:
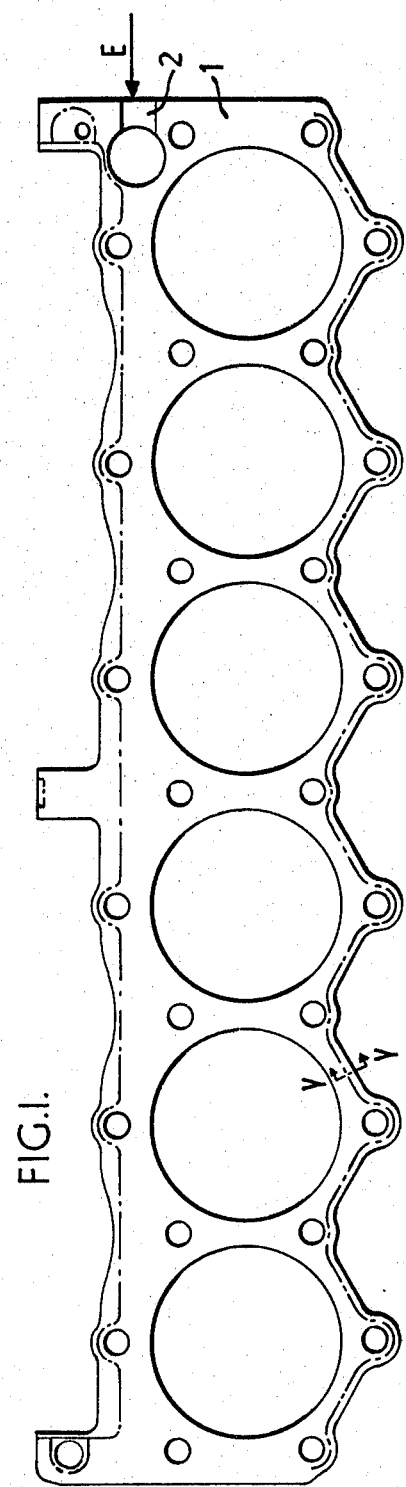
FIG. 1 is a plan view of the gasket.
Figure 5:
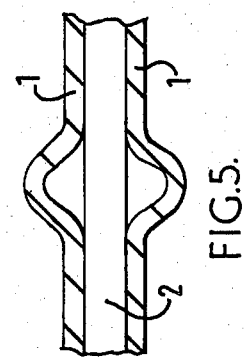
FIG. 5 is an enlarged section on line Y—Y of FIG. 1.

Referring to FIG. 1 in conjunction with FIG. 5 one form of corrugation, which runs along each side margin of the gasket, is of single V-shaped profile. The single wave has an overall width of 0.063 inches and a height, measured from the outer surface plane of the plate 1, of between 0.037 and 0.040 inches.

Figure 4:
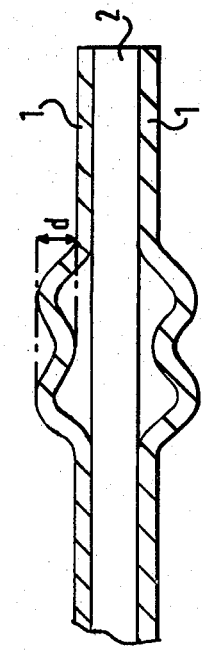
FIG. 4 is an enlarged section on line X—X of FIG. 2.
Figure 2:
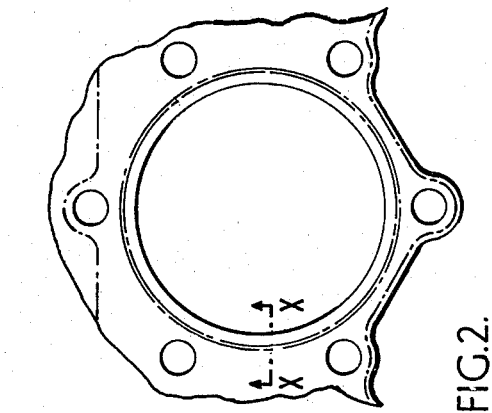
FIG. 2 is a view showing part of the gasket adjacent a cylinder bore opening to a larger scale.

The other form of corrugation (not shown in FIG. 1), which circumscribes each cylinder bore opening but which is only illustrated in FIG. 2 for one such opening, is of double V-shaped profile as illustrated in FIG. 4. This double V-shaped profile has the characteristic defined in my already mentioned U.S. Pat. No. 4,203,608 that the distance d between a plane which contains the apices of the two waves and a plane parallel thereto which contains the base of the trough between the two waves is significantly less than the distance between the first plane and the base plane of the sheet. In the present instance the overall width of the two waves is 0.125 inches, the distance between wave peaks is 0.063 inches and the distance d is 0.030 inches.

The gasket as above described requires only a moderate clamp load in the region of 120 lbs/ft. Further when this same gasket was installed and subjected to cyclic testing for 158 hours followed by 50 hours of full power endurance testing there was no loss of torque whatsoever.

It is to be understood that the thickness of the central plate may be varied depending upon the amount of resilience required for the gasket. It is also to be understood that the paths, profiles and dimensions of the gasket can be varied to meet the particular operating requirements of the engine in which it is intended to be installed.

I claim:

1. A gasket comprising a pair of outer metal plates having outwardly directed corrugations formed therein and a central composite metal plate disposed between the two outer plates, the said central composite plate comprising a central soft metal layer having hard metal layers on each surface.

2. A gasket according to claim 1 wherein each outer plate has a double wave form sectional configuration in which the distance between a plane which contains the apices of the two waves and a plane parallel thereto which contains the base of the trough between the two waves is significantly less than the distance between the first plane and the base plane of the plate.

3. A gasket according to claim 1 wherein the surface layers of the central composite metal plate are formed by rolling the said composite plate to harden the surfaces after a bright annealing operation.

* * * * *